M. WOODBURY & N. W. ALDRICH.
COIN CONTROLLED FOOD DISPENSING APPARATUS.
APPLICATION FILED APR. 17, 1908.
902,358.
Patented Oct. 27, 1908.
2 SHEETS—SHEET 1.
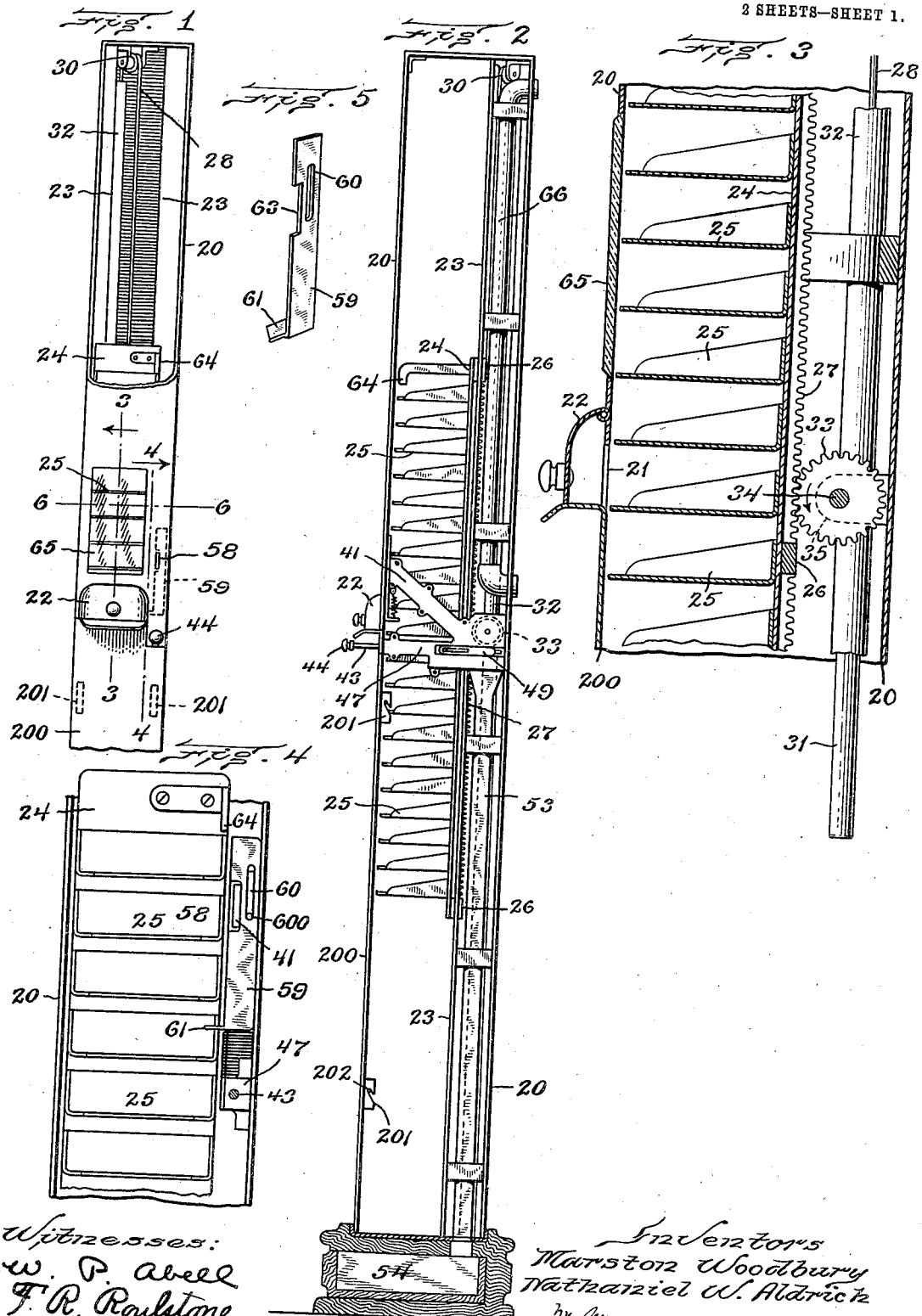

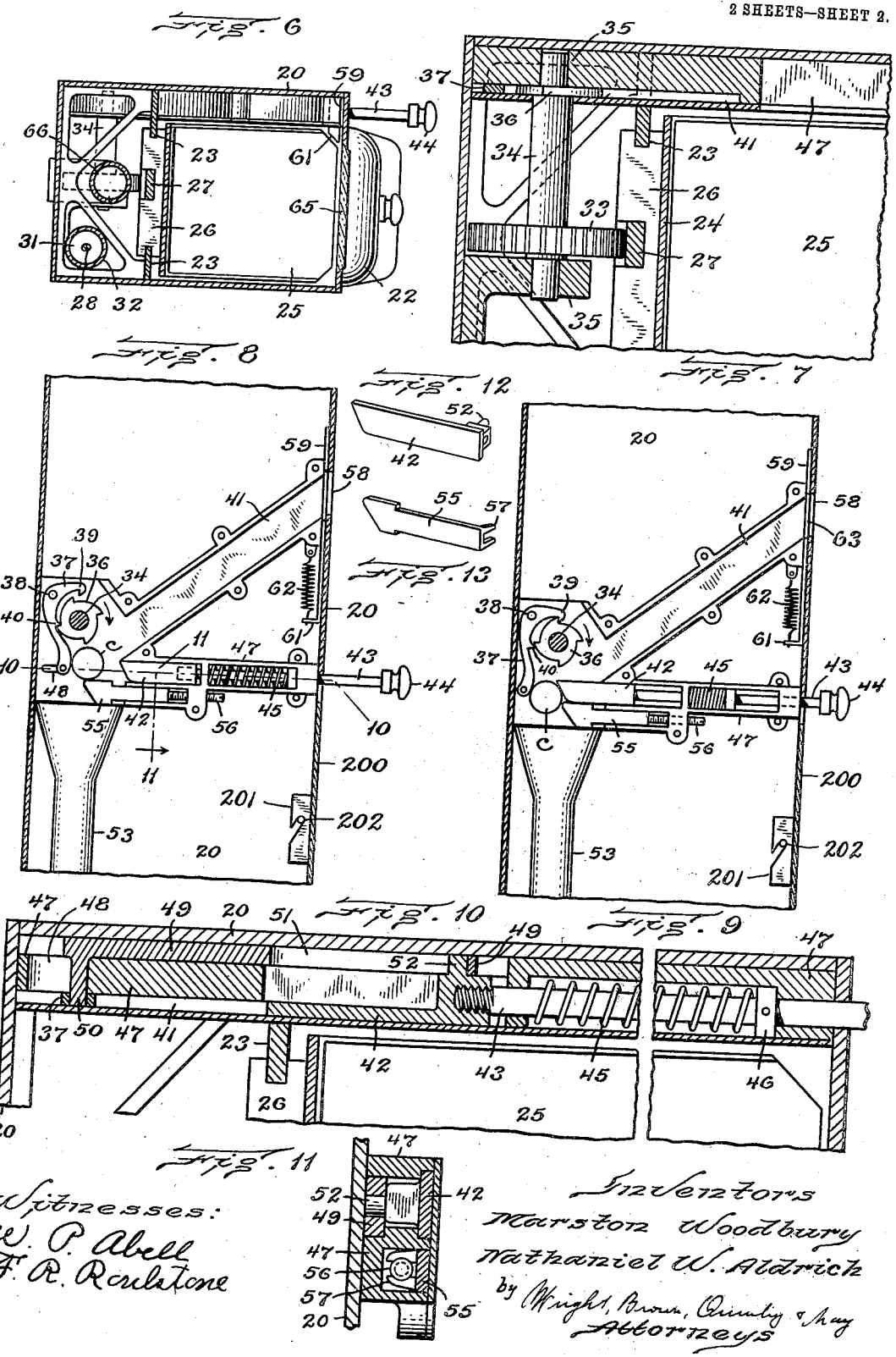

UNITED STATES PATENT OFFICE.

MARSTON WOODBURY, OF BROOKLINE, AND NATHANIEL W. ALDRICH, OF BOSTON, MASSACHUSETTS.

COIN-CONTROLLED FOOD-DISPENSING APPARATUS.

No. 902,358.

Specification of Letters Patent.

Patented Oct. 27, 1908.

Application filed April 17, 1908. Serial No. 427,689.

*To all whom it may concern:*

Be it known that we, MARSTON WOODBURY, of Brookline, in the county of Norfolk and State of Massachusetts, and NATHANIEL W.
ALDRICH, of Boston, in the county of Suffolk and State of Massachusetts, have invented certain new and useful Improvements in Coin-Controlled Food-Dispensing Apparatus, of which the following is a specification.

This invention relates to apparatus for automatically dispensing articles of value upon the deposit of a coin or token.

The object of our invention is to provide an apparatus of this character which will dispense any kind of food such as sandwiches or cake, or even slabs or packages of ice cream. We are able to sell the latter goods or other articles, which should be cold, by reason of employing means whereby the inside of the portion of the casing, which contains the eatables, may be kept either cold or hot. While ordinary sandwiches may be considered equally palatable whether or not they are at the temperature of the surrounding atmosphere, some sandwiches, especially chicken or lobster salad employing lettuce, are much improved in taste if cold. On the other hand, some sandwiches and some kinds of pie are preferred hot. Under one feature of our invention, we are enabled to have one apparatus kept heated internally, and another one kept at a low temperature of any desired degree according to the refrigerant employed.

With the above-mentioned objects in view, we have provided an apparatus which comprises a series of trays bodily movable past an opening in a casing, and means controlled by the introduction of a coin or token whereby the said series will pass the opening step by step so as to enable the would be purchaser to remove one sandwich or other package of food from the shelf which is opposite said opening, and a conduit through which any fluid refrigerant or heating medium may be carried in order to keep the interior of the portion of the casing, which contains the unconsumed or undelivered packages, at a temperature that may be desired to make the food most palatable.

Of the accompanying drawings, which illustrate one compartment or casing, and embodying our invention, Figure 1 represents a front elevation of the upper portion of the apparatus with the front partially broken out to show the interior. Fig. 2 is a side elevation of the complete apparatus with the side wall of the casing removed to show the interior, and with the base in section. Fig. 3 represents a detail section on line 3—3 of Fig. 1 on a larger scale. Fig. 4 represents a detail section on line 4—4 of Fig. 1. Fig. 5 is a perspective view of the slot-closing plate. Fig. 6 represents a section on line 6—6 of Fig. 1 on a larger scale. Fig. 7 is a section on a still larger scale, in a horizontal plane below the line of section of Fig. 6. Figs. 8 and 9 are detail elevations of the coin-controlling mechanism, showing the parts in different positions. Fig. 10 represents a section on line 10—10 of Fig. 8 on a larger scale. Fig. 11 represents a section on line 11—11 of Fig. 8, but drawn to the scale of Fig. 10. Figs. 12 and 13 are perspective views of the plunger and adjustable gage respectively.

Similar reference characters indicate the same or similar parts in all of the views.

An upright casing 20, preferably of sheet metal, is provided with a delivery opening 21 through which access can be had to the goods on the shelves or trays inside of the casing. Said opening is preferably normally closed by a hinged lid 22 which can be readily opened by the customer, said lid being employed to exclude dust and to also preserve the interior temperature.

Vertically movable inside of the casing, is a series of food supports, the same comprising trays 25 rigidly connected with the vertical plate 24, which latter is preferably provided with several blocks or cross strips 26 which engage the vertical ways 23. Said ways 23 serve to guide the connected series of trays, the latter having a rack 27 and being connected by a cord 28 running over a pulley 30 to a weight 31, adapted to slide in a guide tube 32. Said weight is intended to partially counterbalance the connected series of trays and the food thereon, but it does not entirely counterbalance. Even when the trays are all empty, they are designed to be a little heavier than the weight so that the entire series of trays will always have a tendency to descend in the casing guided by the ways 23. To prevent the descent of the trays and to insure that they can be actuated only step by step past the delivery opening, we employ a pinion or gear 33 meshing with the rack 27 and rigidly connected with the shaft 34 mounted in bearings 35, said shaft also having a toothed wheel or ratchet 36 (see Figs. 8 and 9) rigidly connected with it. In order to permit said ratchet to move only step by step so as to permit the tray frame to descend past the opening with a step by step movement, each of which shall be equal to the space between each two shelves, we employ an escapement mechanism comprising a pawl 37, pivoted at 38 and having two teeth 39 and 40 adapted to alternately engage the teeth of the ratchet 36. By mechanisms, which will be presently described, the pawl normally occupies the position shown in Fig. 8.

41 indicates a coin chute crossing the lower end of which is a plunger 42 having a rod 43 (see Fig. 10), the outer end of the rod 43, outside of the casing, being provided with a knob 44. A spring 45 is coiled about the rod 43 and is under tension between a collar 46, secured to the rod 43, and a fixed portion of the apparatus, said fixed portion comprising a part of what we will hereinafter refer to as the fixed guide 47.

The guide 47 is formed with a slot 48 at its rear end, through which a pin 50 of a slide 49 projects, the end of said pin 50 entering a hole in the lower end of the pawl 37. The slide 49 is formed with a slot 51 through which a pin 52 projecting from the plunger 42 projects. When a coin c is dropped into the chute onto the gage 55, presently described, it is utilized to transmit motion from the plunger to the pawl. After the purchaser drops a coin in, he pushes the rod 43 and plunger 42 inward to its extreme limit. During the latter part of this motion, the coin pushes the pawl from the position shown in Fig. 8 to the position shown in Fig. 9, thus releasing one tooth of the ratchet. But the tooth 39 of the pawl prevents the ratchet from moving much farther than is sufficient to enable another tooth of the ratchet to pass the tooth 40 of the pawl. The extreme end of the plunger is beveled so that, after this motion has been accomplished, the coin is ejected and permitted to drop into the coin guide 53 where it will finally land in the cash drawer 54 (see Fig. 2). As soon as the plunger is released, the spring 45 returns it to the position shown in Fig. 8. The latter portion of the return movement of the plunger causes the pin 52 to engage the end of the slot 51 in the slide 49, and the pin 50 of the latter causes the pawl to return with certainty to the position indicated in Fig. 8, which position is at the limit prescribed by the end of the slot 48 in the fixed guide 47.

Of course a coin can only be freed from position between the plunger and the pawl when it is of a diameter that will permit it to pass the inner end of the gage 55. In order that the space for the passage of the coin may be accurately formed, the gage 55 is adjustable. Preferably the adjustment is accomplished by means of a screw 56 having a head at its inner end engaging a fork 57 of said gage 55, (see Figs. 11 and 13).

The slot in the casing for the insertion of the coin is indicated at 58. In order that said slot may be automatically closed to prevent the insertion of a coin when the stock of goods has become exhausted, we employ a plate 59 (see Figs. 4, 5 and 8), said plate having a slot 60 through which a pin 600 from the casing or frame of the machine projects. The plate 59 has a foot lug 61 and is normally held in raised position by a spring 62 so that a notch 63, in one edge of the plate, will register with the coin slot 58 of the casing. But, when the rack frame and the series of trays has been lowered until the uppermost tray is opposite the delivery opening 21, a lug or arm 64, projecting from the upper portion of the tray frame, see Fig. 2, will contact with the foot lug 61, and depress the plate 59 so that the coin slot will be closed by reason of the notch 63 being carried out of registration with said coin slot.

For some purposes, in order that the condition of the stock of goods may be examined, we prefer to locate a plate of glass 65 in the front wall of the casing just above the delivery opening.

Mounted inside of the casing and in the upper portion thereof and behind the rack frame, a pipe or conduit 66 is located, the ends of said pipe or conduit projecting through the rear wall of the casing and thereby adapted to be connected to any suitable means for delivering a current of a heating or cooling medium through said conduit 66. It is not essential that this conduit extend below the horizontal plane of the delivery opening because at no time will there be any eatables contained in the casing below that plane. The conduit is preferably located as close to the shelves or trays as possible, so that, if the conduit is carrying a heating medium, the heat will be transmitted to the trays so that the trays themselves will be kept warm either by conduction or by convection. And on the contrary when the conduit is being employed to refrigerate, its close proximity to the rack frame will enable it to extract heat from the trays by conduction or convection. In practice, the sandwiches or other goods to be sold will be preferably wrapped as in paraffin paper and one placed on each tray until the entire series is loaded. For this purpose, the lower portion of the casing, indicated in Fig. 2 at 200, is removable. Said front portion has slotted lugs 201, which hook over or engage pins 202 projecting from the side walls of the casing. Since the trays are of course to be loaded or filled only when they are in the lower part of the casing, and since said trays do not get into a position behind the removable portion excepting when they are empty, it is not necessary that the removable portion of the casing shall possess any locking means. It is sufficient to simply engage the hook lugs with the pins. When the trays have been loaded in the lower portion of the casing, the proprietor simply pushes the entire series upward to the extreme limit, the ratchet 36 permitting this to be done. He then restores the removable section 200 and the apparatus is ready to deliver whatever is in the lower tray, upon the deposit of the proper coin and the pushing in of the plunger. This permits the tray frame to drop the distance of the space from one tray to the next so that the person, who has deposited the coin, can open the lid 22 and remove the goods from said lower tray. Repetitions of this operation will gradually permit the series of trays to be emptied, the tray moving downward with a step by step movement until the coin slot is closed by the operation of the lug 64 acting upon the slot-closing plate in the manner hereinbefore described.

We claim:—

1. An apparatus of the character described, comprising a shaft, dispensing mechanism controlled by said shaft, a ratchet fixed to said shaft, an escapement pawl controlling said ratchet, a spring retracted plunger movable toward said pawl, a slide, connections between said slide and plunger whereby a portion of the movement of the plunger is transmitted to said slide, said slide having a pin to which said pawl is connected, and a chute for directing a coin between the plunger and pawl.

2. An apparatus of the character described, comprising a shaft, dispensing mechanism controlled by said shaft, a ratchet fixed to said shaft, an escapement pawl controlling said ratchet, a slide having a pin engaging said pawl and having a slot, a spring retracted plunger having a pin entering the slot of said slide, and a chute for directing a coin between the plunger and pawl.

3. An apparatus of the character described, comprising a shaft, dispensing mechanism controlled by said shaft, a ratchet fixed to said shaft, an escapement pawl controlling said ratchet, a slotted member, said pawl having a pin projecting through the slot of said member, a slide engaged with said pin, said slide having a slot, a spring retracted plunger having a pin entering the slot of said slide, and a chute for directing the coin between the plunger and pawl.

4. An apparatus of the character described, comprising a shaft, dispensing mechanism controlled by said shaft, a ratchet fixed to said shaft, an escapement pawl controlling said ratchet, a guide, a plunger mounted in said guide and movable toward and from said plunger and having its end inclined downwardly and rearwardly, a spring normally retracting said plunger, an adjustable gage mounted in said guide below the plunger, a chute for directing a coin between the plunger and pawl, and connections for transmitting return movement of the plunger to the pawl.

5. An apparatus of the character described, comprising a shaft, dispensing mechanism controlled by said shaft, a ratchet fixed to said shaft, an escapement pawl controlling said ratchet, a spring retracted plunger movable toward said pawl, an adjustable gage for determining the diameter of a coin which may pass the lower end of the pawl, a chute for directing a coin onto the end of said gage, and connections for transmitting return movement of the plunger to the pawl.

6. An apparatus of the character described comprising a casing having a coin slot, a coin chute registering with said slot, dispensing mechanism in said casing, means for controlling the movement of said dispensing mechanism by the introduction of a coin, said means including a plunger to engage a coin, a plate mounted within the casing and having a slot normally registering with the slot in the casing, and means whereby the dispensing mechanism may actuate said plate to carry its slot out of alinement with the casing slot.

In testimony whereof we have affixed our signatures, in presence of two witnesses.

MARSTON WOODBURY.
NATHANIEL W. ALDRICH.

Witnesses:
P. W. PEZZETTI,
F. R. ROULSTONE.